2,993,026
EPOXY RESIN COMPOSITION CONTAINING DIGLYCIDYL ETHER OF 2,4'-DIHYDROXY DIPHENYL SULFONE

William C. Duckworth and John Edward Singley, Atlanta, Ga., assignors to Tennessee Corporation, New York, N.Y., a corporation of New York
No Drawing. Filed Aug. 25, 1958, Ser. No. 757,115
3 Claims. (Cl. 260—42)

This invention relates to epoxy resin compositons of the type comprising the diglycidyl ethers of bisphenols such as dihydroxy diphenyl dimethylmethane and/or the polymerized derivatives of such ethers, and more particularly to the improvement of certain properties of resins of this type by the addition thereto of diglycidyl ether of dihydroxy diphenyl sulfone. This application is a continuation-in-part of our prior application Serial No. 634,401, filed January 16, 1957, now abandoned.

It is known to produce epoxy resins by the condensation of epichlorohydrin with bisphenols in which two phenolic radicals are linked through a single carbon atom, this reaction forming diglycidyl ethers and polymers thereof. For example, some of the so-called "Epon" resins are formed by condensing epichlorohydrin with "Bisphenol A," i.e., with dihydroxy diphenyl dimethylmethane. Theoretically, the condensation of two moles of epichlorohydrin with one mole of Bisphenol A should produce the diglycidyl ether mentioned above (Epon 828) having the formula (1)

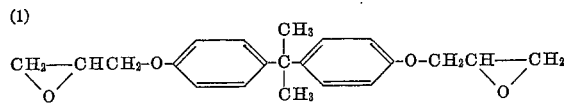

In practice, however, polymerization is likely to take place with the formation of polymerized products of lower epoxy content and higher molecular weight (e.g., the higher numbered Epons) which are represented by the formula (2)

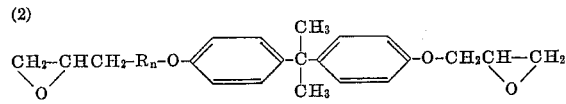

where R is

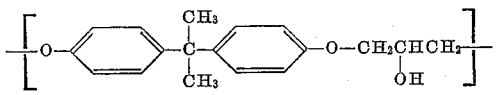

Thus even though a large excess of epichlorohydrin is used in an effort to minimize polymerization, the diglycidyl ethers represented by Formula 1, such as Epon 828, will often contain appreciable amounts of polymerized products as represented by Formula 2. In other cases the formation of products of type (2) may be encouraged by using less epichlorohydrin, the resulting products (e.g., the higher numbered Epons) being essentially of the type represented by Formula 2 although they may contain some of the monomer represented by Formula 1. Examples of such polymerized products of lower epoxy content and higher molecular weight are the Epons 834, 864, 1001, 1004, 1007 and 1009.

Compounds such as Bisphenol A may be prepared by any desired procedure such as that disclosed in United States Patent No. 2,468,982. The epoxy resins are obtained by reaction of such compounds with epichlorohydrin or the like in an alkaline medium, these reactions being well known and in widespread use. For present purposes such resins may be described generically as epoxy resins which consist essentially of a diglycidyl ether of a bisphenol of the general formula (3)

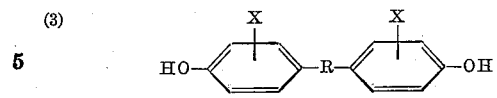

where R is an aliphatic radical and X is hydrogen, halogen, alkyl, or other substituent that does not interfere materially with etherification, and/or polymerized derivatives of such a diglycidyl ether.

Epoxy resins of the above types are widely used for many purposes. For cast or molded plastic bodies, for example, resins of the type of Epon 828 are usually employed, being mixed with suitable curing agents such as polycarboxylic acids or di- or polyamines to convert the relatively low-melting ethers into harder, higher-melting materials. For surface coatings and the like, on the other hand, products of the type of Formula 2 are usually preferred, such as the higher numbered Epons mentioned above. Curing can take place by reaction of the curing agent with the terminal epoxide groups in Formulas 1 and 2 and also with the hydroxyl groups in Formula 2. Examples of amines that have been proposed for curing purposes are ethylene diamine, hexamethylene diamine, diethylene triamine, diethylaminopropylamine, 4,4'-diaminodiphenylmethane (DDM), diaminodiphenyl sulfone (see copending application of Charles E. Feasel et al., Serial No. 745,289, filed June 30, 1958), and many others. Such cured resin compositons are satisfactory for many purposes and have been widely used.

It is an object of this invention to improve the useful properties of cured products of the type described above by providing a novel epoxy resin composition which, when cured as aforesaid, has increased thermal stability and increased resistance to solvent action as compared with similar cured resins heretofore used.

It is also known to produce epoxy resins similar to Epons but where the phenolic radicals are linked by $SO_2$. Bisphenol S, for example, is a dihydroxydiphenyl sulfone comprising 80% or more of the 4,4' isomer and not more than about 20% of the 2,4' isomer. This bisphenol can be reacted with epichlorohydrin to form epoxy resins analogous to those of Formulas 1 and 2. Such resins are difficult to cure because in order to reduce viscosity, the temperature must be so high that charring and other adverse effects take place. These resins have been mixed with resins of the Epon type for purposes of adhesive compositions, as disclosed for example in British Patent No. 629,111, but such mixtures cannot be used for casting purposes with satisfactory results because of charring, formation of bubbles, etc.

We have found that the foregoing objects can be achieved and the aforementioned difficulties avoided by adding to epoxy resins of the types of Formulas 1 and/or 2 an appropriate amount of diglycidyl ether of 2,4'-dihydroxy diphenyl sulfone consisting essentially of the product represented by the following formula:

(4)

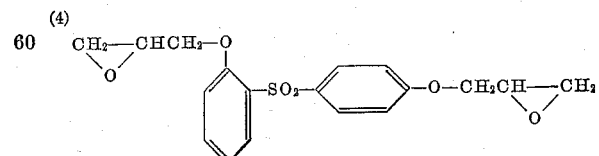

It will be understood from what has been said above regarding products of types (1) and (2) that, even though a large excess of epichlorohydrin is used in producing the product of Formula 4, some polymerization may take place with consequent formation of polymers of higher molecular weight analogous to those of Formula 2.

Sulfone resins of type (4) (including polymers as indicated above) are analogous in structure and composition to the Epon resins of type (3) and are readily miscible and compatible therewith in practically any desired proportion, the resulting mixture or mixtures being handled to all intents and purposes in the same manner as corresponding Epon resins. The terminal epoxide groups of Formula 4 and the terminal epoxide groups and intermediate hydroxyl groups of polymerization products are reactive toward curing agents in the same way as the corresponding groups of Formulas 1 and 2. Such mixtures when cured have markedly increased thermal stability and resistance to solvent action, while at the same time their viscosity is low enough to permit handling without difficulty for molding purposes and the curing actions take place at temperatures and under conditions such that clear solid castings are obtained. For these reasons compositions embodying the present invention are particularly advantageous for use in making plastic tools and other molded plastic articles, although they may also be used in surface coatings and for any other desired purposes.

The sulfone resin of Formula 4 can be obtained from any suitable source or produced in any suitable manner. By way of example, mixtures of 2,4′- and 4,4′-dihydroxy diphenyl sulfones are produced by reacting $SO_3$ with an excess of phenol and by heating the reaction mixture while removing water of hydration. The reactions taking place may be represented as follows:

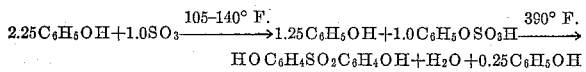

$$2.25C_6H_5OH + 1.0SO_3 \xrightarrow{105-140°\,F.} 1.25C_6H_5OH + 1.0C_6H_5OSO_3H \xrightarrow{390°\,F.}$$
$$HOC_6H_4SO_2C_6H_4OH + H_2O + 0.25C_6H_5OH$$

These isomers can be separated by crystallization from benzene-acetone solutions according to the method of L. E. Hinkel and G. H. R. Summers, J. Chem. Soc. (1949), 2854–6; C.A. 3935$b$ (1950). The 2,4′-isomer is then reacted with epichlorohydrin to form the diglycidyl ether of Formula 4. A typical working example is as follows:

Into a 300 ml. 3 neck flask equipped with condenser head, condenser, thermometers, stirrer, and Glas-Col heating mantle were added 50 g. 2,4′-dihydroxy diphenyl sulfone, 185 g. epichlorohydrin and 1 g. $H_2O$. A total of 16 g. NaOH pellets was added in small increments over a one hour period.

| Time (min.) | T., ° C., Pot. | T., ° C., Head | Remarks |
| --- | --- | --- | --- |
| 0 | 90 | | 2.8 g. NaOH added. |
| 15 | 104 | | Do. |
| 17 | 110 | 80 | Distillation started. |
| 30 | 110.5 | 92 | 2.8 NaOH added. |
| 45 | 105.5 | 82 | Do. |
| 60 | 101.5 | 51 | 4.8 g. NaOH added. |
| 75 | 98.5 | 43 | 29 ml. E.C.H.,[1] 3 ml. $H_2O$ off. |
| 90 | 109 | 88 | 35 ml. E.C.H.,[1] 4 ml. $H_2O$ off. |
| 105 | 117 | 101 | 40 ml. E.C.H.,[1] 5 ml. $H_2O$ off. |
| 112 | 119 | 115 | 51 ml. E.C.H.,[1] 6 ml. $H_2O$ off. |
| 135 | 120 | 115 | 63 ml. E.C.H.,[1] 6 ml. $H_2O$ off. |

[1] E.C.H.=epichlorohydrin.

63 ml. of fresh epichlorohydrin were returned to the pot and the mixture was heated to 100° C. The salt was filtered with aspirator suction and washed with small increments of hot epichlorohydrin. The clear epichlorohydrin solution of resin was returned to a clean pot and gradually heated up with an oil bath, the epichlorohydrin being removed with 20 mm. Hg pressure from an aspirator. A final temperature of 160° C. for the oil bath was reached, at which point the resin was a clear melt weighing 71 g. It was poured into a glass container and was a light yellow material having a Durran softening point of 43° C. and containing 4.8 moles epoxy per kilogram. The salt cake weighed 26 g. and contained 3 g. resin with 0.7 mole epoxy group per kilogram.

The resins of types (3) and (4) can be mixed in widely varying proportions according to the properties desired in the final cured product. As little as 10% sulfone resin produces a material improvement in the thermal resistance and solvent resistance of the cured resin mixture as compared with cured resins of type (3), and for some purposes the resin mixture may contain as much as 90% sulfone resin. In most cases, however, the amount of sulfone resin will fall between 25% and 75%. In the case of castings and the like, which as stated above are usually formed of cured resins of the Formula 1 type, the improvement in thermal resistance is readily ascertainable by determining the heat distortion temperatures of the castings according to standard procedures; resistance to solvents can also be measured by standard methods such as immersion of the castings in the solvent for a period of time over which the percent loss of weight of the casting is determined. This property of increased solvent resistance is also of great value in the case of surface coatings which as stated above are usually formed of resins of the Formula 2 type.

Table I illustrates the effect of the sulfone resin on heat distortion temperatures of castings made of Epon 828 mixed with varying amounts of sulfone resin. In these cases the castings were made by curing the resin mixtures with DDM (supra). Heat distortion temperatures were determined by the procedure of ASTM designation D648–45T. The castings were loaded as simple beams to a stress of 264 p.s.i. and the temperature was noted at which a 10 mil deformation occurred. Results are as follows:

*Table I*

| Composition of resin mixture: | Heat distortion temperature ° C. |
| --- | --- |
| 100% Epon 828 | 148.0 |
| 75% Epon 828, 25% sulfone resin | 151.0 |
| 50% Epon 828, 50% sulfone resin | 157.0 |
| 25% Epon 828, 75% sulfone resin | 164.2 |

Solvent resistance tests of the same mixtures were conducted by immersing test pieces of the castings ⅛″ x ½″ x 2½″ in size in different solvents and determining changes in physical characteristics and especially changes in weight after prescribed periods of time. Results obtained with castings of the same composition as in Table I, after immersion in methanol and acetone for three and six months periods, were as follows:

*Table II*

| Composition of Resin Mixture | | Percent Change in Weight of Casting | | | |
| --- | --- | --- | --- | --- | --- |
| Epon 828, Percent | Sulfone Resin, Percent | Methanol | | Acetone | |
| | | 3 Mos. | 6 Mos. | 3 Mos. | 6 Mos. |
| 100 | 0 | 12.5 | 16.9 | 27.6 | 26.0 |
| 75 | 25 | 15.5 | 16.2 | 25.6 | 25.6 |
| 50 | 50 | 9.9 | 13.8 | 25.8 | 25.6 |
| 25 | 75 | 7.3 | 10.2 | 14.6 | 23.0 |

Thus it will be seen that the addition of appropriate proportions of the sulfone resin of Formula 4 to resinous materials of type (3) produces epoxy resin compositions which, when cured as aforesaid, provide products of substantially improved physical properties, particularly with regard to thermal stability and resistance to solvents. With regard to heat distortion temperature, Table I shows progressive improvement over the entire range tested. With regard to resistance to solvent action, on the other hand, Table II indicates that improvement is relatively minor until the proportion of sulfone resin reaches the neighborhood of 50% so that in this case higher proportions of the sulfone resin are desirable, say 50% to 75% or even 90%.

The use of resin mixtures of the present invention in the preparation of surface coatings is illustrated by the following example: 50 parts by weight of Epon 1004 and 50 parts by weight of sulfone resin were mixed and esterified with 80% of the amount of linseed fatty acids theoretically required. These acids contained 25% linolenic acid and 61% linoleic acid, the balance being oleic, stearic and palmitic acids. A 36% solution of the resulting ester in mineral spirits was formed into surface coatings of 0.5 ml. film thickness by dip coating. After four weeks the Sward rocker hardness was 34, and the coatings passed both the ⅛" conical mandril flexibility test and the 160 lb. impact resistance test after one week and also after four weeks.

For molding and casting operations, resin compositions embodying the invention have the important advantages that while thermal stability is increased (higher HDT) as shown above, yet viscosity remains low so that the resin can be handled at relatively low temperatures, and the exotherm also is relatively low while pot life is increased. Lower viscosity means, of course, that it is easier to mix the resin composition with curing agents. Also in making castings and laminates it is necessary for the resin-curing agent mixture to penetrate and fill the voil spaces in the filler material, mold, or the like, and the ease with which this takes place depends in part on the viscosity of the mixture. Not only does lower viscosity facilitate such penetration, but also it makes possible the use of lower temperatures which avoid charring, over-vigorous or violent reactions, formation of bubbles, etc. The exotherm determines the amount of heat which must be removed and thus governs the rise in temperature of the mold, while pot life is important because it measures the length of time available for working with the mixture before it begins to set up.

As an illustration of the above advantages, the following table compares the viscosities at various temperatures of (1) a 50–50 mixture of Epon 828 with the diglycidyl ether of Bisphenol S mentioned above with those of (2) a similar 50–50 mixture of Epon 828 and resin of type (4):

| T., °C. | Viscosity Centipoises | |
|---|---|---|
| | Resin Mixture (1) | Resin Mixture (2) |
| 50 | 8,800 | |
| 60 | 1,850 | 1,420 |
| 70 | 600 | 461 |
| 90 | 170 | 142 |
| 110 | 125 | 53 |

These same resin mixtures were tested for exotherm by adding 70 parts per hundred of curing agent to 200 gram resin mixture samples at 130–135° C. These mixtures were placed in cans immersed in a constant temperature oil bath held at 150° C. and readings of the internal temperatures of the samples were taken every minute by means of thermometers suspended in the cans. Gel time was also observed each minute by noting the condition of the resin samples on an applicator. In 13 minutes resin mixture (1) gelled and its temperature rose to a maximum of 266° C., as compared with a gel time of 35 minutes and a maximum temperature of only 212° C. in the case of resin mixture (2).

As an example of the use of a mixture such as described above in the manufacture of a plastic tool, 100 parts by weight of a 50/50 mixture of Epon 828 and type (4) resin was melted at 100° C., and 14 parts by weight of solid metaphenylene diamine (MPD) were added and the mixture stirred until the curing agent melted. Then the mixture was poured into a tool steel mold approximately two inches square and having a one inch square center pole, the mold being at 150° C. The male mold section was then placed over the resin mixture and the whole inserted in a press at 100° C. which applied pressure of 300 lbs./sq. in. for one hour. Thereafter the mixture was postcured for another hour at 150° C. without pressure.

In this manner a plastic tool was made that conformed very closely to the original mold; there was practically no shrinkage. The tool is two inches square, about one-half inch deep with a one inch square hole in the center. This plastic tool was supported in the original mold and satisfactorily used with a male punch to shape a 20 gauge cold rolled steel panel and two 20 gauge aluminum panels.

It will be understood that the invention is not restricted to the details of the foregoing description and that reference should be had to the appended claims for a definition of its limits.

What is claimed: is

1. An epoxy resin composition curable to form castings, surface coatings and the like containing (a) an epoxy resin consisting essentially of a member of the group consisting of a diglycidyl ether of a bisphenol in which two phenol radicals are linked together through a carbon atom and polymerized derivatives of such a diglycidyl ether, and (b) an epoxy resin consisting essentially of diglycidyl ether of 2,4'-dihydroxy diphenyl sulfone, resin (b) being in the proportion of 10% to 90% by weight of resin (a).

2. An epoxy resin composition curable to form castings, surface coatings and the like containing (a) an epoxy resin consisting essentially of a member of the group consisting of diglycidyl ether of dihydroxy diphenyl dimethylmethane and its polymers, and (b) an epoxy resin consisting essentially of diglycidyl ether of 2,4'-dihydroxy diphenyl sulfone, resin (b) being in the proportion of 10% to 90% by weight of resin (a).

3. An epoxy resin composition curable to form castings, surface coatings and the like containing (a) an epoxy resin consisting essentially of diglycidyl ether of dihydroxy diphenyl dimethylmethane having the formula

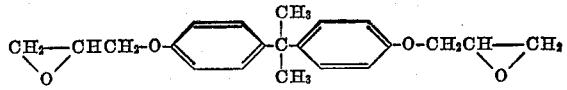

and (b) an epoxy resin consisting essentially of diglycidyl ether of 2,4'-dihydroxy diphenyl sulfone having the formula

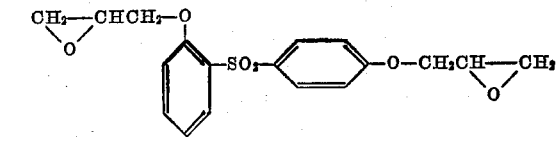

References Cited in the file of this patent

UNITED STATES PATENTS

| 2,735,829 | Wiles et al. | Feb. 21, 1956 |
| 2,767,157 | Masters | Oct. 16, 1956 |

FOREIGN PATENTS

| 133,819 | Australia | Aug. 10, 1949 |